(12) United States Patent
Jackson et al.

(10) Patent No.: US 10,960,932 B2
(45) Date of Patent: Mar. 30, 2021

(54) MOTOR VEHICLE FLOOR ASSEMBLY

(71) Applicant: Ford Global Technologies, LLC, Dearborn, MI (US)

(72) Inventors: Daniel T. Jackson, Basildon (GB); Ken George Dell, Rainham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 16/507,164

(22) Filed: Jul. 10, 2019

(65) Prior Publication Data
US 2020/0017148 A1 Jan. 16, 2020

(30) Foreign Application Priority Data
Jul. 13, 2018 (GB) ...................................... 1811501

(51) Int. Cl.
*B62D 25/20* (2006.01)
*B62D 29/00* (2006.01)

(52) U.S. Cl.
CPC ....... *B62D 25/2009* (2013.01); *B62D 29/001* (2013.01)

(58) Field of Classification Search
CPC ........................... B62D 25/2009; B62D 29/001
See application file for complete search history.

(56) References Cited

U.S. PATENT DOCUMENTS

| | | | |
|---|---|---|---|
| 4,898,419 A * | 2/1990 | Kenmochi | B62D 21/10 296/191 |
| 5,054,843 A | 10/1991 | Gray | |
| 8,919,484 B2 * | 12/2014 | Leopold | B60K 17/06 180/291 |
| 2005/0040675 A1 | 2/2005 | Fitze | |
| 2010/0117394 A1 | 5/2010 | Teli et al. | |
| 2011/0133518 A1 * | 6/2011 | Wanke | B62D 25/2018 296/203.02 |
| 2013/0257100 A1 * | 10/2013 | Marchesano | B62D 25/00 296/191 |
| 2016/0200221 A1 | 7/2016 | Perlo et al. | |

(Continued)

FOREIGN PATENT DOCUMENTS

| | | |
|---|---|---|
| DE | 19520007 A1 | 11/1996 |
| DE | 10132969 A1 | 1/2003 |

(Continued)

OTHER PUBLICATIONS

European Search Report for European Application No. 19184500.7 dated Nov. 25, 2019.

(Continued)

*Primary Examiner* — Lori L Lyjak
(74) *Attorney, Agent, or Firm* — David Coppiellie; Carlson, Gaskey & Olds, P.C.

(57) ABSTRACT

This disclosure relates to a motor vehicle floor assembly, and further relates to a method of constructing a motor vehicle which reduces the number of fixing points (i.e., fastener attachment points) on a vehicle chassis. An example floor assembly includes a vehicle frame, a floor panel, and at least one underbody vehicle component forming a subassembly with the floor panel installed to an underside of the vehicle frame. The floor panel comprises at least one recess configured to receive a portion of the vehicle frame.

18 Claims, 6 Drawing Sheets

(56) References Cited

U.S. PATENT DOCUMENTS

| | | | | |
|---|---|---|---|---|
| 2017/0021740 | A1* | 1/2017 | Brendecke | B60L 58/26 |
| 2017/0120951 | A1* | 5/2017 | Ashraf | B62D 27/023 |
| 2017/0225587 | A1* | 8/2017 | Newman | H01M 10/613 |
| 2018/0337374 | A1* | 11/2018 | Matecki | H01M 10/656 |
| 2020/0207221 | A1* | 7/2020 | Matecki | B60L 50/66 |

FOREIGN PATENT DOCUMENTS

| | | |
|---|---|---|
| DE | 102005049213 A1 | 5/2007 |
| DE | 102012109464 A1 | 5/2014 |
| EP | 1151909 A2 | 11/2001 |
| EP | 1688298 A1 | 8/2006 |
| EP | 1942039 A1 | 7/2008 |
| FR | 2972418 A1 | 9/2012 |
| GB | 2347653 A | 9/2000 |
| JP | 2006182295 A | 7/2006 |
| JP | 2012056395 A | 3/2012 |
| WO | 2008099128 A3 | 8/2008 |
| WO | 2014161948 A1 | 10/2014 |

OTHER PUBLICATIONS

Great Britain Search Report for Application No. GB1811501.4 dated Nov. 21, 2018.

\* cited by examiner

MOTOR VEHICLE FLOOR ASSEMBLY

RELATED APPLICATION(S)

This application claims priority to GB Patent Application No. GB 1811501.4, filed on Jul. 13, 2018, the entirety of which is herein incorporated by reference.

TECHNICAL FIELD

This disclosure relates to a motor vehicle floor assembly, and further relates to a method of constructing a motor vehicle which reduces the number of fixing points on a vehicle chassis.

BACKGROUND

A modern vehicle platform typically includes a vehicle frame, such as a chassis, a floor panel, and one or more vehicle ancillary components, such as an exhaust system and/or a fuel system of the vehicle. During the assembly of the vehicle, it is standard practice to assemble the floor panel to the vehicle frame so that the ancillary components of the vehicle can be assembled to the vehicle at a later stage of production.

It is common for vehicle manufacturers to supply many different variants of a vehicle. For example, a commercial vehicle, such as a van, may be manufactured for use as cargo vehicle or a passenger vehicle. The cargo vehicle and the passenger vehicle may share a common vehicle frame design, which can be later modified to suit the desired use of the vehicle.

SUMMARY

A floor assembly for a motor vehicle according to an exemplary aspect of the present disclosure includes, among other things, a vehicle frame, a floor panel, and at least one underbody vehicle component forming a subassembly with the floor panel installed to an underside of the vehicle frame. The floor panel comprises at least one recess configured to receive a portion of the vehicle frame.

In a further non-limiting embodiment of the foregoing floor assembly, the floor panel comprises an attachment point configured to receive a fastener of the at least one underbody vehicle component, the attachment point is formed integral to the floor panel, and the attachment point is configured to secure the at least one underbody vehicle component to the floor panel.

In a further non-limiting embodiment of any of the foregoing floor assemblies, the attachment point is overmoulded with the floor panel.

In a further non-limiting embodiment of any of the foregoing floor assemblies, the floor panel comprises a support member configured to attach to the vehicle frame to strengthen the vehicle frame.

In a further non-limiting embodiment of any of the foregoing floor assemblies, the support member extends substantially across the vehicle frame when the floor panel is installed the vehicle frame.

In a further non-limiting embodiment of any of the foregoing floor assemblies, the support member is overmoulded with the floor panel.

In a further non-limiting embodiment of any of the foregoing floor assemblies, the floor panel is made of one of a composite material, a polymeric material, and a metallic material.

In a further non-limiting embodiment of any of the foregoing floor assemblies, the floor panel is configured to seal an opening of the vehicle frame.

In a further non-limiting embodiment of any of the foregoing floor assemblies, the floor panel spans substantially at least one of a length and a width of an opening of the vehicle frame.

In a further non-limiting embodiment of any of the foregoing floor assemblies, the floor panel spans substantially both of the length and the width of the opening of the vehicle frame.

In a further non-limiting embodiment of any of the foregoing floor assemblies, the at least one underbody vehicle component comprises at least a portion of at least one of an exhaust system, a fuel system, an electrical system, and a brake system of the vehicle.

In a further non-limiting embodiment of any of the foregoing floor assemblies, a top surface of the floor panel comprises a portion of interior trim of the vehicle.

In a further non-limiting embodiment of any of the foregoing floor assemblies, a seat of the motor vehicle is attached to a top surface of the floor panel.

A motor vehicle according to an exemplary aspect of the present disclosure includes, among other things, any one or more of the foregoing floor assemblies. Further, a top surface of the floor panel forms a loadspace floor of the vehicle when a subassembly and a vehicle frame are in an assembled configuration.

A method of assembling a motor vehicle floor assembly according to an exemplary aspect of the present disclosure includes attaching at least one underbody vehicle component to a floor panel thereby defining a subassembly, wherein the floor panel comprises at least one recess, and subsequently installing the subassembly to the underside of a frame of the vehicle such that the recess receives a portion of the vehicle frame.

In a further non-limiting embodiment of the foregoing method, the method further includes selecting the floor panel from a plurality of differently configured floor panels prior to attaching the at least one underbody vehicle component to the floor panel.

In a further non-limiting embodiment of any of the foregoing methods, the method includes overmoulding a support member with the floor panel before the installing step, and the support member extends substantially across the vehicle frame when the floor panel is installed the vehicle frame.

In a further non-limiting embodiment of any of the foregoing methods, the method includes overmoulding an attachment point to the floor panel before the attaching step.

In a further non-limiting embodiment of any of the foregoing methods, the attaching step includes using the attachment point to attach the at least one underbody vehicle component to the floor panel.

In a further non-limiting embodiment of any of the foregoing methods, the installing step includes fully sealing an opening of the vehicle frame with the floor panel.

DETAILED DESCRIPTION

Figure 1:
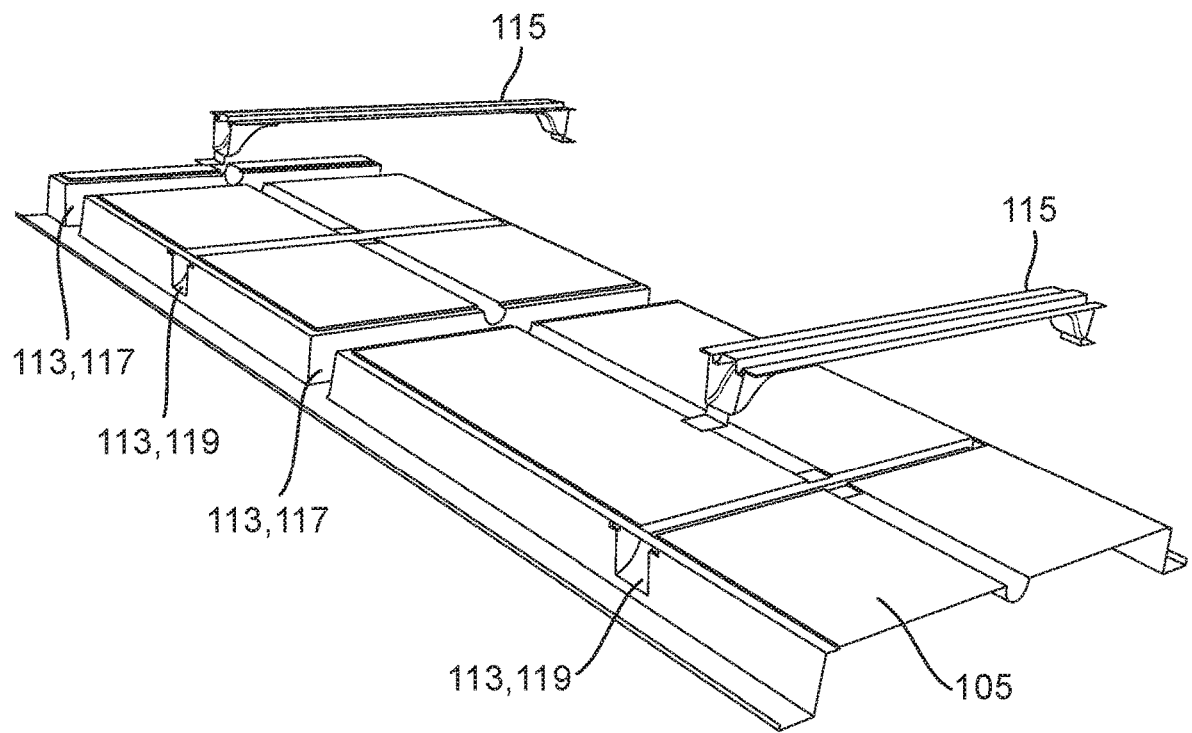
FIG. 1 illustrates a floor panel and structural members.

This disclosure relates to a motor vehicle floor assembly, and further relates to a method of constructing a motor vehicle which reduces the number of fixing points (i.e., fastener attachment points) on a vehicle chassis. An example floor assembly includes a vehicle frame, a floor panel, and at least one underbody vehicle component forming a subassembly with the floor panel installed to an underside of the vehicle frame. The floor panel comprises at least one recess configured to receive a portion of the vehicle frame. This disclosure simplifies the vehicle frame and increases the ease of assembly of the underbody components to the vehicle. These and other benefits will be appreciated from the below description.

According to an aspect of the present disclosure there is provided a motor vehicle floor assembly comprising a vehicle frame, a floor panel (e.g., floor platform), and at least one ancillary vehicle component (e.g., an underbody vehicle component). The floor panel and the at least one ancillary vehicle component form a subassembly configured to be installed to the underside of the vehicle frame (e.g., in a single assembly operation). For example, the subassembly, which comprises the floor panel and at least one underbody vehicle component secured to the floor panel, may be assembled to the vehicle frame so that the underbody vehicle component is secured to the vehicle frame (e.g., without the need for another assembly operation). In other words, the action of securing the underbody vehicle component may be taken to be a final assembly operation for the underbody vehicle component (i.e., an assembly operation that secures the underbody vehicle component to the vehicle, so that it can be used and/or assembled to another component). The floor panel comprises at least one recess (e.g., a channel), configured to receive a portion of the vehicle frame in an installed configuration.

The vehicle frame may form at least a portion of a chassis of the vehicle. The vehicle frame may be a ladderframe of a vehicle, which defines at least one opening into which at least a portion of the floor panel may be installed.

The underbody vehicle component may comprise at least a portion of at least one of an exhaust system, a fuel system, an electrical system, a brake system, a suspension system, a powertrain, and any other appropriate underbody vehicle component.

The floor panel may comprise at least one attachment point configured to receive a fixing (i.e., a fastener, such as a screw, bolt, etc.) of the at least one underbody vehicle component. For example, the floor panel may comprise an insert (e.g., a threaded insert) configured to receive the fixing of the underbody vehicle component. The attachment point may comprise an insert that is formed integral to the floor panel. For example, the attachment point may be machined directly into the floor panel. The floor panel may be formed by virtue of a moulding process. As such, the attachment point may be a separate insert that is overmoulded into the floor panel, such that the attachment point is integral to the floor panel once the floor panel has been fabricated. The attachment point may be a separate article that is secured to the floor panel once the floor panel has been manufactured. The attachment point of the floor panel may be configured to replace (i.e., used instead of), an attachment point of the vehicle frame. For example, a conventional vehicle frame may comprise an attachment point, such as a bracket, configured to receive a fixing of an underbody vehicle component. However, where the floor panel of the present disclosure comprises a similar attachment point configured to receive a fixing of an underbody vehicle component, the vehicle frame need not be provided with any attachment point.

The attachment point of the floor panel may be configured to secure the at least one underbody vehicle component to the floor panel, and thus to the vehicle frame, when the floor panel has been assembled to the vehicle frame.

The floor panel may comprise at least one support member configured to attach to the vehicle frame to strengthen the vehicle frame when the floor assembly is assembled to the vehicle frame. For example, where the floor panel is formed by virtue of a moulding process, the support member may be a separate component that is over-moulded into the floor panel, such that the support member is integral to the floor panel once the floor panel has been fabricated. The support member may be a separate article that is secured to the floor panel once the floor panel has been manufactured. The support member may be configured to brace the vehicle frame when the floor panel, which comprises the support member, has been installed to the vehicle frame. In this manner, the support member may be configured to increase the stiffness of at least one of the floor panel and the vehicle frame. The support member may be configured to extend substantially across an opening in the vehicle frame when the floor panel is installed the vehicle frame.

The floor panel may be configured to seal against the vehicle frame to prevent the ingress of pollutants from the underside of the vehicle to the inside of the vehicle, in an assembled configuration. The floor panel may have a top surface configured to form a loadspace floor of the motor vehicle when the subassembly and the vehicle frame are in an assembled configuration. The top surface of the floor panel may comprise a portion of interior trim of the vehicle, such as a carpet and/or a rubber mat. The floor panel may be configured to span substantially at least one of the length and the width of an opening formed by the vehicle frame.

The vehicle frame and the floor panel may be configured such that the floor panel can be assembled to the underside of the vehicle frame with the at least one underbody component already assembled to the floor panel.

The floor panel may be fabricated from a polymeric material. Additionally or alternatively, the floor panel may be fabricated from a composite material. The floor panel may be fabricated using a moulding process. Additionally or alternatively, the floor panel may be fabricated from a metallic material. The floor panel may be fabricated using a stamping process.

There may be provided a vehicle comprising the above described floor assembly.

According to another aspect of the present disclosure there is provided a method of assembling a motor vehicle floor assembly, including attaching at least one underbody vehicle component to a floor panel, and subsequently installing the floor panel to the underside of a frame of the vehicle with the at least one underbody component assembled to the floor panel such that the recess receives a portion of the vehicle frame.

The method may comprise selecting the floor panel from a plurality of differently configured floor panels prior to attaching the at least one underbody vehicle component to the floor panel. For example, there may be provided a first floor panel configured for a first use case (e.g., for use as a passenger vehicle), and a second floor panel configured for a second use case (e.g., for use as a commercial vehicle). Each of the first floor panel and a second floor panel may be of substantially the same shape and configured to attach to a similarly configured vehicle frame. In other words, the method may comprise a step of manufacturing a common vehicle frame that can be used across a range of vehicle variants, and manufacturing the first floor panel and a second floor panel that may be selectively assembled to the vehicle frame, such that the resultant vehicle floor assembly has one of a plurality of different use cases.

To avoid unnecessary duplication and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

The present disclosure provides a motor vehicle floor assembly and a method of assembly thereof. The motor vehicle may be any type of vehicle, such a car, a van, a truck, or a motorcycle. However, for the sake of example, in the arrangement shown in the accompanying figures, the motor vehicle is a commercial vehicle, such as a van.

FIGS. 1 to 5 depict various stages of manufacture of the motor vehicle floor assembly 101. In the context of the present disclosure, the term "motor vehicle floor assembly" refers to a portion of a vehicle comprising a vehicle frame 103 and a subassembly comprising a floor panel 105 and one or more underbody components 107 of the vehicle. In particular, the motor vehicle floor assembly 101 is considered to be a portion of a motor vehicle that forms a structural body portion of the vehicle to which one or more other components of the vehicle, such as a powertrain, running gear, and/or a body panel of the vehicle, may be assembled. The vehicle frame 103 may comprise at least a portion of a chassis of a vehicle. For example, the vehicle frame 103 may comprise at least one portion of closed or open framework configured to form the structural base of the vehicle to which other major components of the vehicle may be assembled.

In the arrangement shown in the appended figures, the vehicle frame 103 comprises a rear portion of the chassis of a van. The vehicle frame 103 is formed from two longitudinal members 109 and three lateral members 111 defining a ladderframe around which the vehicle may be built. However, the vehicle frame 103 may comprise any appropriate number of members depending on the application of the vehicle frame 103, and/or any other appropriate vehicle components, such as an A-pillar, B-pillar, etc.

During the design and manufacture of a vehicle, a vehicle manufacturer may design the vehicle frame 103 so that it is common across a range of vehicle variants. For example, the vehicle manufacturer may design the vehicle frame 103 so that it can be used as the base for a commercial vehicle, such as a van or a truck, and as the base for a passenger vehicle, such as a bus. As a result, the vehicle frame 103 usually has features, such as fixing points, brackets, and reinforcing members, that are redundant for some variants of the vehicle. For example, where the vehicle frame 103 is to be used with a first type of power train, the number and type of underbody components that are required can be different from where the vehicle frame 103 is to be used with a second type of power train. Furthermore, ancillary vehicle systems, such as an electrical distribution system (EDS) and an exhaust system, are usually fitted to the underside of the vehicle frame 103 in an assembly line process during the final assembly of the vehicle, which can be an awkward operation for a worker on the assembly line, since the worker has to maneuver themselves underneath the vehicle in order to assemble the ancillary vehicle system to the vehicle. The present disclosure is advantageous in that it allows for the simplification of the vehicle frame 103 and the easier assembly of the underbody components 107 to the vehicle.

FIG. 1 shows a floor panel 105 of the motor vehicle floor assembly 101. The floor panel 105 is configured to be installed to a vehicle frame, such as a ladder frame of a van, and is substantially planar in form, comprising a flange extending along each of the longer edges of the floor panel 105. While a particular floor panel 105 is shown in FIG. 1, the floor panel 105 may be of any appropriate form depending on the shape/type of the vehicle frame and its required application.

The floor panel 105 may comprise one or more recessed portions (e.g., channels) that extend at least partially through and/or across the floor panel. In the arrangement shown in FIG. 1, the floor panel 105 comprises four channels 113 that extend laterally across the floor panel 105. Each of the channels 113 may be configured to receive another component of the vehicle when the floor panel 105 is installed to the vehicle. For example, the floor panel 105 may comprise channels 117 that are configured to receive an appropriate portion of the vehicle frame 103, such as the lateral members 111, when the floor panel 105 is installed to the vehicle frame 103. It can be seen, therefore, that the floor panel 105 may be configured to fit adjacent to, adjoining to and/or around any appropriate portion of the vehicle frame 103.

Additionally or alternatively, the floor panel 105 may comprise channels 119, each configured to receive a structural member 115, such as a structural member that does not form part of the vehicle frame 103. The structural member 115 may be configured to increase the stiffness of the floor panel 105, where required. For example, where a variant of the vehicle is to be used in high load applications, such as where the vehicle is fitted with a high powered engine and/or is configured to carry heavy loads, the floor panel 105 may be fitted with one or more structural members 115 to strengthen the floor panel 105 and the vehicle frame 103 when the floor panel 105 is installed to the vehicle frame 103. However, where the vehicle variant is to be used in lower load applications, it may not be necessary to fit the structural members 115 to the floor panel 105. In this manner, the vehicle frame 103 need not incorporate any unwarranted additional lateral members 111, which means that the vehicle frame 103 can be designed for a lightest load condition.

Figure 2:
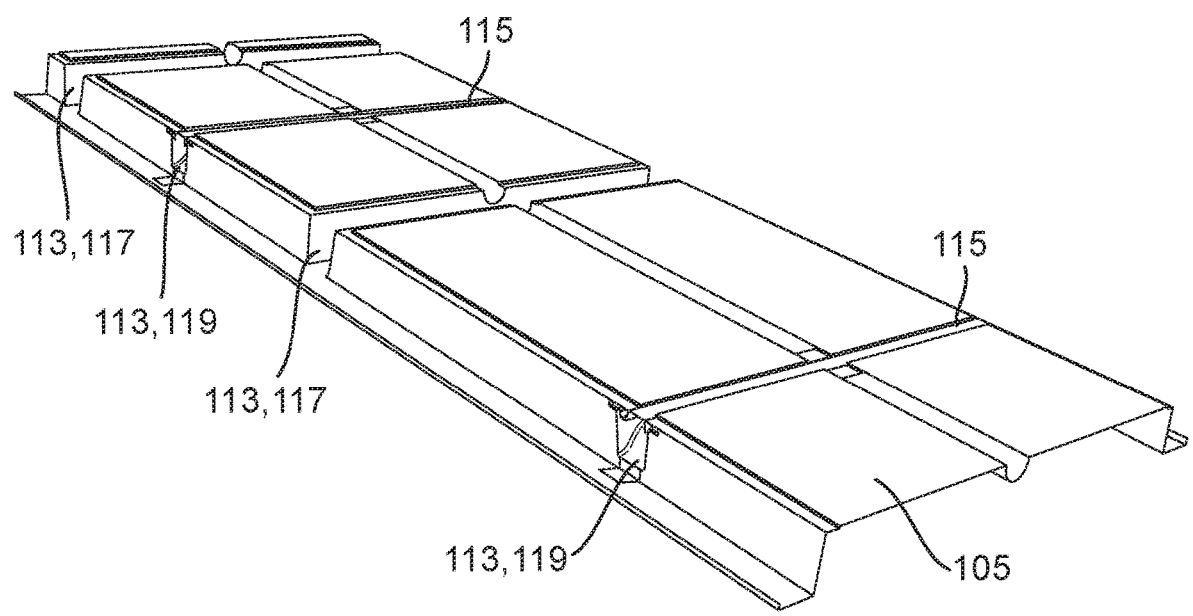
FIG. 2 illustrates the floor panel and the structural members of FIG. 1 in an assembled configuration.

FIG. 2 shows the floor panel 105 having two structural members 115 installed in respective channels 119. The structural members 115 may be assembled to the floor panel 105 once the floor panel 105 has been manufactured, or during the process of manufacturing the floor panel 105. For example, the structural members 115 may be joined to the floor panel 105 using conventional fastening means, such as fasteners and/or adhesive, or the structural members 115 may be overmoulded into the floor panel 105, such as where the floor panel 105 is made from a polymeric or composite material.

The above described floor panel 105 can thus be manufactured according to the desired use of the vehicle, which reduces the complexity in the design and manufacture of the vehicle frame 103. Such a reduction in complexity allows for the vehicle frame 103 to be designed and manufactured according to a use case having the fewest requirements, and for some of the design complexity of the vehicle frame 103 to be transferred to the floor panel 105.

Figure 3:
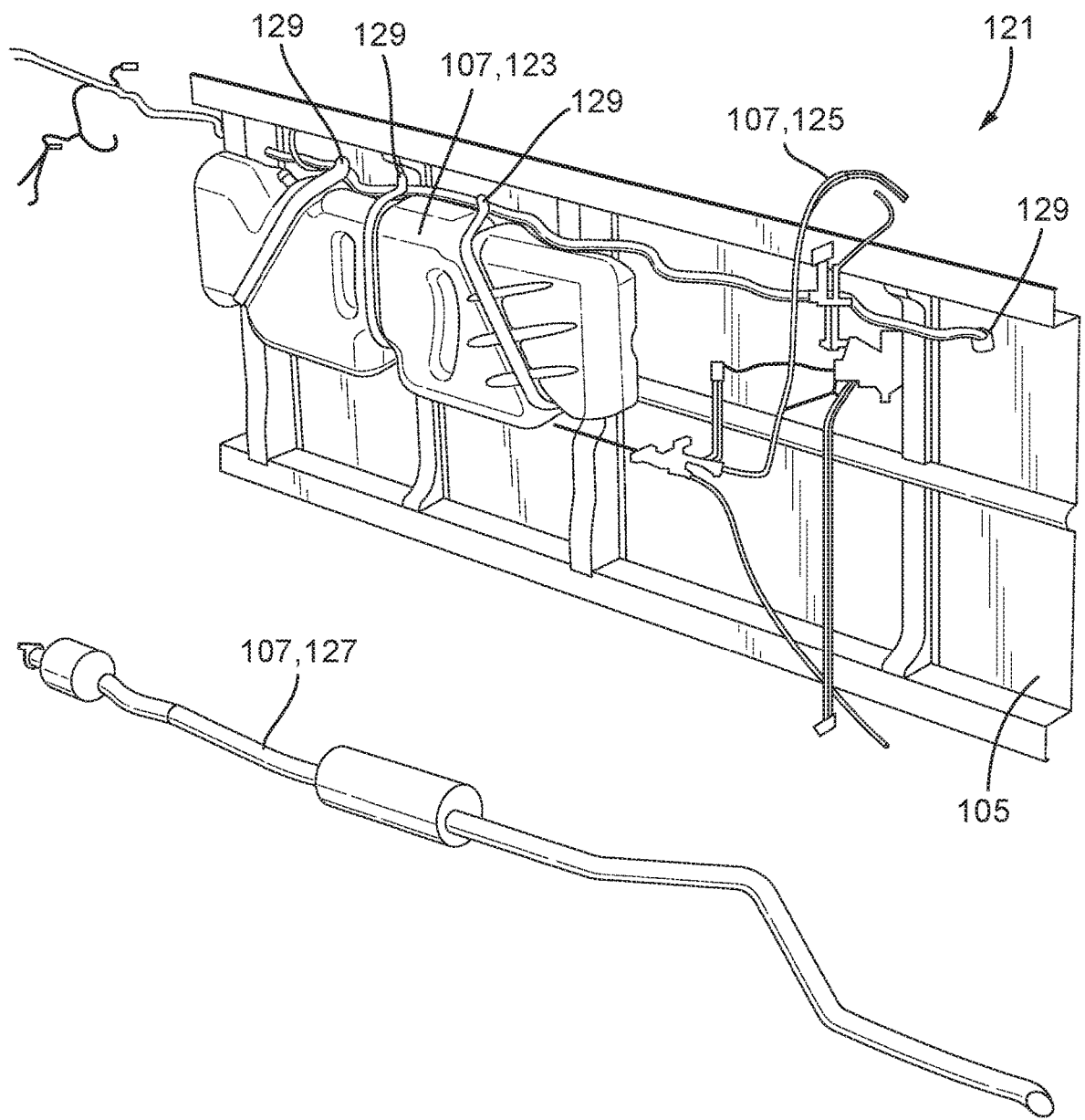
FIG. 3 illustrates a subassembly comprising the floor panel and a plurality of underbody vehicle components.

FIG. 3 depicts a step of forming a subassembly 121 comprising the floor panel 105 and a plurality of underbody vehicle components 107. In the arrangement of FIG. 3, the floor panel 105 is being installed with a portion of a fuel system 123, a portion of a brake system 125, and a portion of an exhaust system 127. However, the floor panel 105 may be installed with any appropriate underbody vehicle components 107. One of the benefits of installing the underbody vehicle components 107 to the floor panel 105 before the floor panel 105 is installed to the vehicle, is that a worker need not be positioned underneath the vehicle to install the components 107 to the floor panel 105. Instead, the floor panel 105 can be oriented on an assembly line, for example, so that the underbody vehicle components 107 can be installed in downward manner onto the underside of the floor panel 105.

The floor panel 105 may comprise one or more attachment points 129 configured to receive a fixing (i.e., a fastener) of the at least one underbody vehicle component 107. For example, where the floor panel 105 is formed from a polymeric material, or a composite material, the attachment points 129 may be over-moulded into the floor panel 105 during the manufacture of the floor panel 105. Additionally or alternatively, the floor panel 105 may be fitted with at least one separate attachment point, such as a bracket, which is assembled to the floor panel 105 using conventional fastening means, such as by one or more fasteners and/or adhesive.

It may be beneficial to provide the floor panel 105 with one or more attachment points 129, as it allows for one or more underbody vehicle components 107 to be secured to the floor panel 105 during a first assembly process thereby forming the subassembly 121, and, subsequently, for the subassembly 121 to be assembled to the vehicle frame 103 during a second assembly process. Such an assembly process may remove the need for one or more attachment points to be provided on the vehicle frame 103. For example, it is common for the vehicle frame 103 to comprise a plurality of brackets to which an underbody component 107 may be secured. However, in order to attach the underbody component 107 to the vehicle frame 103 once the floor panel 105 has been installed to the vehicle frame 103, the floor panel 105 often comprises an opening (e.g., a hole or cut-out) configured to allow access to the bracket on the vehicle frame 103. The present disclosure is thus advantageous as it does not require any openings in the floor panel 105, which allows for the floor panel 105 to fully seal against the underside of the vehicle frame 103. This removes the need for a separate sealing structure to be installed to the vehicle.

Figure 4:
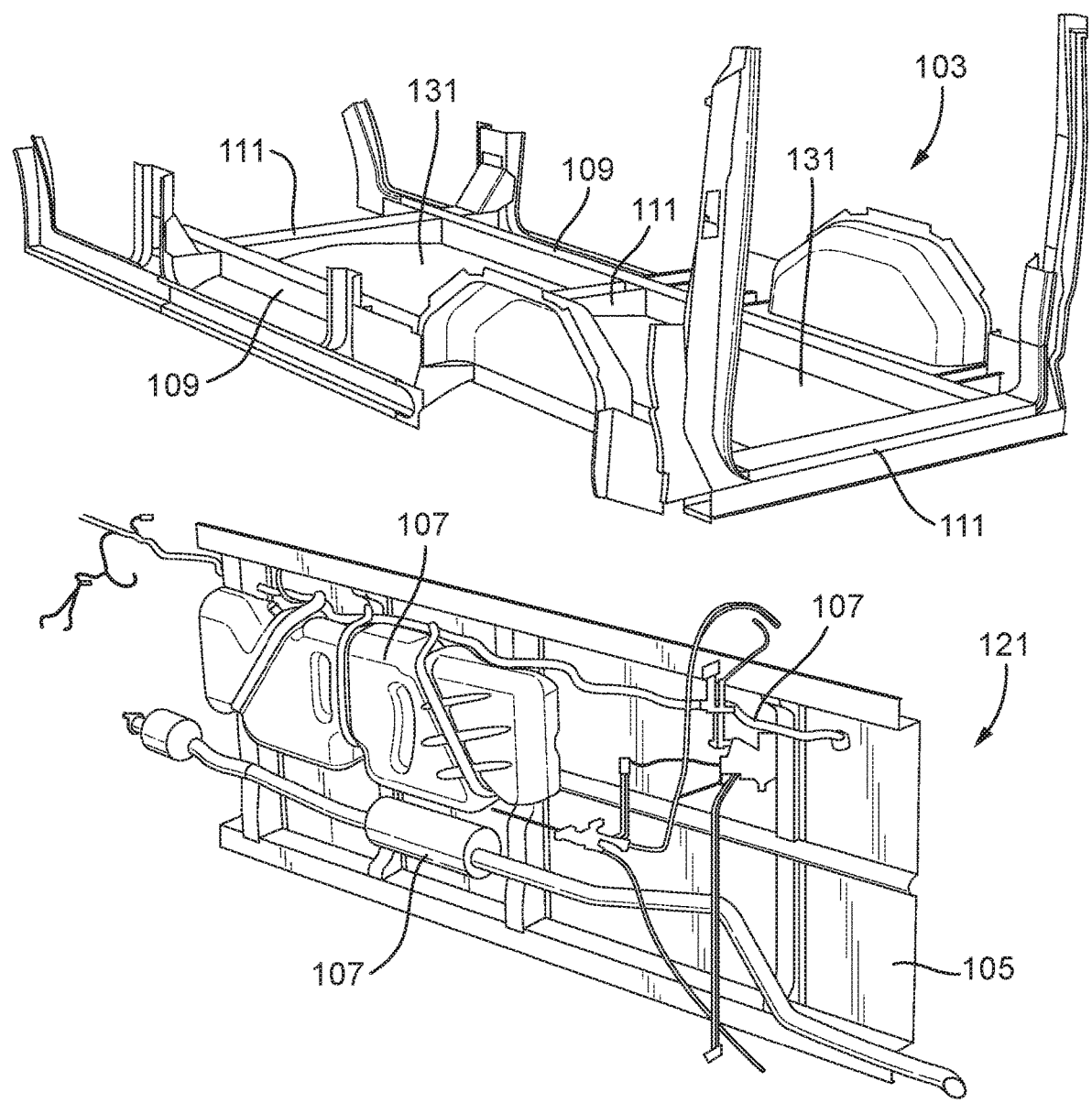
FIG. 4 illustrates the subassembly of FIG. 3 in an assembled configuration, and further illustrates a vehicle frame.

FIG. 4 depicts a step of installing the subassembly 121 to the vehicle frame 103. As mentioned above, the vehicle frame 103 may be a standard vehicle frame 103 that is configured for use in the lightest possible load case for all vehicle variants that use the vehicle frame 103. As such, the vehicle frame 103 does not comprise any additional fixing/attachment points, or structural members, above those required for the lightest possible load case. The subassembly 121 may be configured depending on the variant of vehicle. For example, where the vehicle variant is a vehicle intended for a high load case, the subassembly 121 may comprise one or more additional structural members 115 pre-installed to the floor panel 105. Additionally or alternatively, the subassembly 121 may comprise one or more underfloor components 107 designed for use with the variant of the vehicle. For example, where the vehicle variant is a long range vehicle, the subassembly may comprise a larger than normal fuel tank, and/or an extra fuel tank.

In this manner, a vehicle assembly line may be provided with a variety of differently configured subassemblies, each subassembly being specifically configured for use on a different vehicle variant. Furthermore, since the underfloor components 107 are already installed to the vehicle frame 103, a worker on the assembly line need not install the underfloor components 107 to the underside of the floor panel 105 after it has been installed to the vehicle frame 103.

In some scenarios, the subassembly 121 may be manufactured at a different location to the location of the assembly line. For example, the floor panel 105 may be supplied to the manufacturer of the underfloor components 107, so that the underfloor components 107 can be assembled to the floor panel 105 before being sent to the vehicle manufacturer for final assembly of the vehicle.

Figure 5:
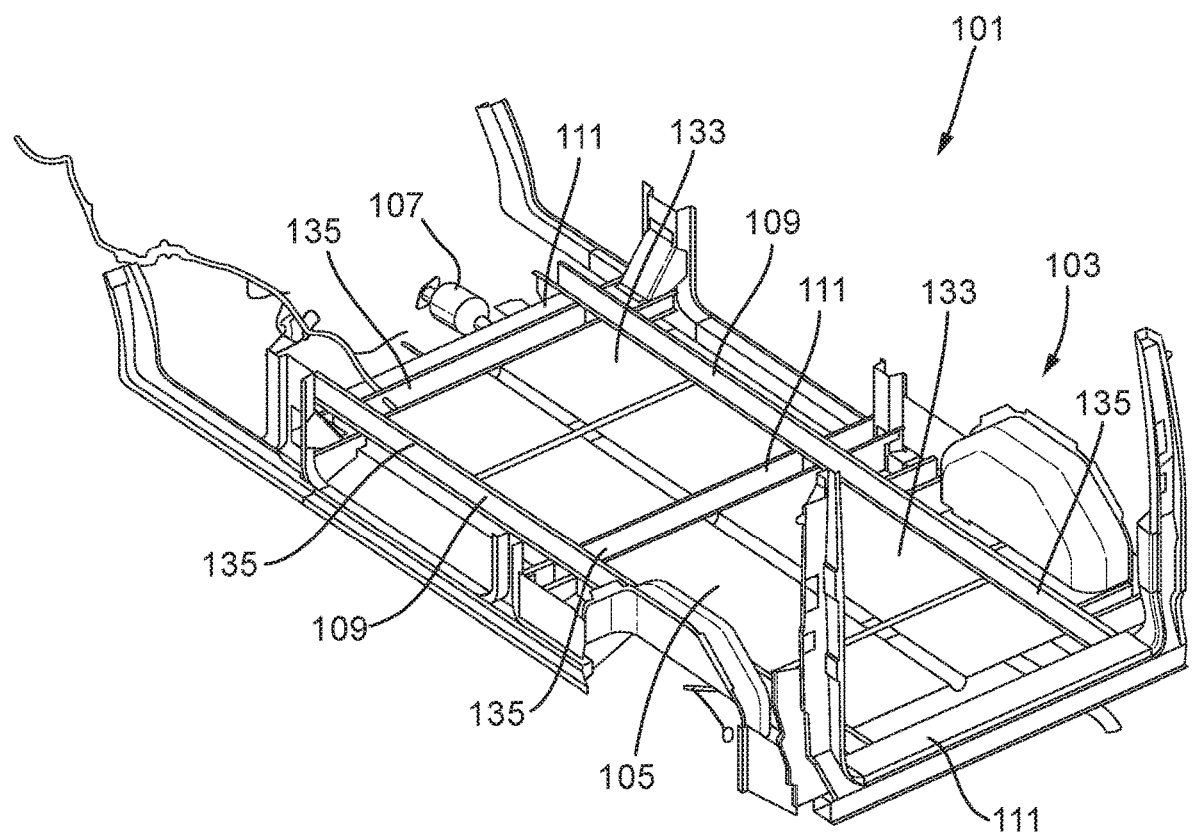
FIG. 5 illustrates the subassembly and the vehicle frame of FIG. 4 in an assembled configuration.

FIG. 5 shows the completed motor vehicle floor assembly 101. The subassembly 121 is located relative to the vehicle frame 103 by virtue of the lateral members 111 of the vehicle frame 103 engaging (i.e., being received in) the channels 117 of the floor panel 105, and the longitudinal members 109 of the vehicle frame 103 engaging the flanges of the floor panel 105. The subassembly 121 may be secured to the vehicle frame 103 using one or more fasteners and/or adhesives. The adhesive may be configured to seal around the perimeter of the floor panel 105 as the floor panel 105 engages the vehicle frame 103. Where the floor panel 105 has been provided with additional structural members 115, the structural members 115 may be secured to the vehicle frame 103 to stiffen the vehicle frame 103. Additionally or alternatively, the floor panel 105, namely the material properties of the floor panel 105, may be selected, adapted or configured to stiffen the vehicle frame 103 when the subassembly 121 is assembled to the vehicle frame 103.

In the arrangement shown in FIG. 5, the floor panel 105 extends fully across, in both a lateral and longitudinal direction, each of the openings 131 (FIG. 4) in the vehicle frame 103. Furthermore, a top surface 133 of the floor panel 105 may form a loadspace floor of the vehicle, when the subassembly 121 is installed to the vehicle frame 103. In the arrangement shown in FIG. 5, the top surface 133 of the floor panel 105 is substantially flush to the top surfaces 135 of the longitudinal and lateral members 109, 111 of the vehicle frame 103. In this manner, the motor vehicle floor assembly 101 provides a substantially planar loadspace floor of the vehicle.

In one or more other arrangements (not shown) the floor panel 105 may be provided with at least one fixing point configured to secure an item of vehicle furniture, such as a seat. For example, the floor panel 105 may comprise a threaded insert formed integral to the floor panel 105 and configured to receive a fastener of a vehicle seat. Furthermore, the top surface 133 of the floor panel 105 may be provided with interior trim, such as a carpet. Indeed, in some arrangements, the subassembly 121 may comprise one or more items of vehicle furniture. In this manner, the present disclosure allows for a simplified manufacturing method of a vehicle floor, by virtue of one or more ancillary vehicle components, such as an underbody component 107 or an interior vehicle component, being preassembled to the floor panel 105 prior to the floor panel 105 being assembled the vehicle frame 103.

Figure 6:
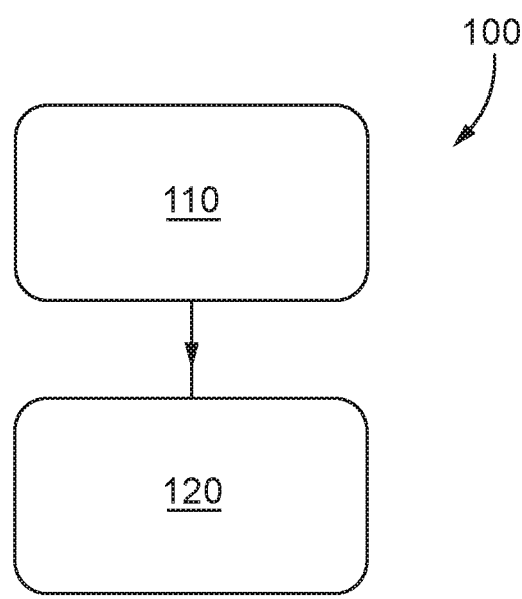
FIG. 6 illustrates a flowchart depicting a method of assembly of the floor panel, the plurality of underbody vehicle components, and the vehicle frame.

FIG. 6 shows a flowchart of a method 100 of assembling the motor vehicle floor assembly 101. The method includes a first step 110 of attaching the at least one underbody vehicle component 107 to the floor panel 105 to define the subassembly 121, and a second step 120 of subsequently installing the subassembly 121 to the underside of the vehicle frame 103 such that the at least one underbody vehicle component 107 is ready for use on the vehicle.

The method may comprise another step of selecting the floor panel from a plurality of differently configured floor panels prior to attaching the at least one underbody vehicle component to the floor panel. For example, there may be provided a first floor panel configured for a first use case, such as for use as a passenger vehicle, and a second floor panel configured for a second use case, such as for use as a commercial vehicle. Each of the first floor panel and a second floor panel may be of substantially the same shape and configured to attach to the same type of vehicle frame. In other words, the method may comprise a step of manufacturing a common vehicle frame that can be used across a range of vehicle variants, and manufacturing the first floor panel and a second floor panel that may be selectively assembled to the vehicle frame, such that the resultant vehicle floor assembly has one of a plurality of different use cases.

It should be understood that terms such as "about," "substantially," and "generally" are not intended to be boundaryless terms, and should be interpreted consistent with the way one skilled in the art would interpret those terms. It should also be understood that directional terms such as "forward," "rear," "side," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A floor assembly for a motor vehicle, comprising:
a vehicle frame;
a floor panel; and
at least one underbody vehicle component installed to an underside of the vehicle frame, wherein the floor panel comprises at least one channel configured to receive a portion of the vehicle frame.

2. The floor assembly as recited in claim 1, wherein:
the floor panel comprises an attachment point configured to receive a fastener of the at least one underbody vehicle component,
the attachment point is formed integral to the floor panel, and
the attachment point is configured to secure the at least one underbody vehicle component to the floor panel.

3. The floor assembly as recited in claim 2, wherein the attachment point is overmoulded with the floor panel.

4. The floor assembly as recited in claim 1, wherein the floor panel comprises a structural member configured to attach to the vehicle frame to strengthen the vehicle frame.

5. The floor assembly as recited in claim 4, wherein the structural member extends substantially across the vehicle frame when the floor panel is installed the vehicle frame.

6. The floor assembly as recited in claim 4, wherein the structural member is overmoulded with the floor panel.

7. The floor assembly as recited in claim 1, wherein the floor panel is made of one of a composite material, a polymeric material, and a metallic material.

8. The floor assembly as recited in claim 1, wherein the floor panel is configured to seal an opening of the vehicle frame.

9. The floor assembly as recited in claim 1, wherein the floor panel spans substantially at least one of a length and a width of an opening of the vehicle frame.

10. The floor assembly as recited in claim 9, wherein the floor panel spans substantially both of the length and the width of the opening of the vehicle frame.

11. The floor assembly as recited in claim 1, wherein the at least one underbody vehicle component comprises at least a portion of at least one of an exhaust system, a fuel system, an electrical system, and a brake system.

12. A motor vehicle comprising, comprising:
a vehicle frame including an opening;
a floor panel made of one of a composite material, a polymeric material, and a metallic material; and
at least one underbody vehicle component forming a subassembly with the floor panel installed to an underside of the vehicle frame,
wherein the floor panel comprises at least one channel configured to receive a portion of the vehicle frame,
wherein the floor panel comprises an attachment point configured to receive a fastener of the at least one underbody vehicle component,
wherein the attachment point is configured to secure the at least one underbody vehicle component to the floor panel,
wherein the floor panel spans substantially both a length and a width of the opening of the vehicle frame,
wherein the at least one underbody vehicle component comprises at least a portion of at least one of an exhaust system, a fuel system, an electrical system, and a brake system of the vehicle, and
wherein a top surface of the floor panel forms a loadspace floor of the vehicle when the subassembly and the vehicle frame are in an assembled configuration.

13. A method of assembling a motor vehicle floor assembly, comprising:
attaching at least one underbody vehicle component to a floor panel thereby defining a subassembly, wherein the floor panel comprises at least one channel; and
subsequently installing the subassembly to the underside of a frame of the vehicle such that the channel receives a portion of the vehicle frame.

14. The method as recited in claim 13, further comprising:
selecting the floor panel from a plurality of differently configured floor panels prior to attaching the at least one underbody vehicle component to the floor panel.

15. The method as recited in claim 13, further comprising:
overmoulding a structural member with the floor panel before the installing step, the structural member extending substantially across the vehicle frame when the floor panel is installed the vehicle frame.

16. The method as recited in claim 13, further comprising:
   overmoulding an attachment point to the floor panel before the attaching step.

17. The method as recited in claim 16, wherein the attaching step includes using the attachment point to attach the at least one underbody vehicle component to the floor panel.

18. The method as recited in claim 13, wherein the installing step includes fully sealing an opening of the vehicle frame with the floor panel.

* * * * *